(12) United States Patent
Sheldon et al.

(10) Patent No.: US 8,083,467 B2
(45) Date of Patent: Dec. 27, 2011

(54) APPARATUS AND METHOD FOR CONTROLLING A ROTARY MACHINE USING PRESSURIZED GAS

(75) Inventors: Karl Edward Sheldon, Liberty Township, OH (US); Michael Anthony Shockling, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1458 days.

(21) Appl. No.: 11/779,147

(22) Filed: Jul. 17, 2007

(65) Prior Publication Data
US 2010/0028126 A1    Feb. 4, 2010

(51) Int. Cl.
*F01D 21/02* (2006.01)
(52) U.S. Cl. .......................................... 415/30; 415/202
(58) Field of Classification Search .................. 415/30, 415/35, 80, 81, 82, 202; 416/197 B, 197 R
See application file for complete search history.

(56) References Cited

U.S. PATENT DOCUMENTS 5,314,299 A  *  5/1994  Jacobsson ...................... 415/30
7,059,136 B2     6/2006  Coffinberry

FOREIGN PATENT DOCUMENTS

JP           02301602  A  *  12/1990

* cited by examiner

*Primary Examiner* — Richard Edgar
(74) *Attorney, Agent, or Firm* — Penny A. Clarke

(57) ABSTRACT

An apparatus and method for controlling rotating bladed machinery by using a source of pressurized gas is disclosed. The source of pressurized gas, such as air, imparts braking torque on a turbomachinery component through the use of one or more impinging orifices or jets. The orientation of the jets is such that the transfer of momentum from the pressurized gas results in a force substantially opposite the direction of rotation of the turbomachinery component. This transfer of momentum from the pressurized gas allows for a controlling torque to be applied to the turbomachinery component without the need of mechanical and/or electrical devices applying torque to the rotating shaft.

10 Claims, 3 Drawing Sheets

APPARATUS AND METHOD FOR CONTROLLING A ROTARY MACHINE USING PRESSURIZED GAS

BACKGROUND

The invention relates generally to a rotary machine, and in particular to an apparatus and method for controlling rotational speed of a component of the rotary machine by using pressurized gas.

Rotary machines include, without limitation, turbines for steam turbines, compressors and turbines for gas turbines and turbines for hybrid fuel cells. A steam turbine has a steam path that typically includes, in serial-flow relationship, a steam inlet, a steam generating device, a turbine and a steam outlet. A gas turbine has a gas path that typically includes, in serial-flow relationship, an air intake (also known as an inlet), a compressor, a combustor, a turbine, and a gas outlet. A hybrid fuel cell has a gas path that typically includes, in serial-flow relationship, an air intake, a compressor, a fuel cell, a turbine and a gas outlet. In the abovementioned turbines, the gases (steam or gas) flow to a turbine that extracts energy for driving a turbine shaft to produce output power for powering an electrical generator. A turbine is typically operated for extended periods of time at a relatively high base load for powering the electrical generator to produce electrical power in a utility grid, for example. In some cases, the rotary machine is subject to a grid transient or load interruption that causes the output breakers of the electrical generator to open thereby resulting in a sudden loss of load that can cause an overspeed condition. The loss of load, in addition to a response time of the rotary machine to the load interruption, may cause an acceleration effect to the rotary components and, at times, result in mechanical damage therein.

In the case of a free-spinning turbomachinery component, such as an unloaded turbine, rotational speed control requires application of torque to the shaft of the turbomachinery component. Previous methods of rotational speed control include the use of a relatively complex mechanical and/or electrical system to provide a load to the shaft. Although such systems are acceptable for most applications, there is a need to provide a simple, reliable, repeatable, lightweight, and inexpensive apparatus and method to impart a torque to a rotating shaft of turbomachinery component without the use of a relatively complex mechanical and/or electrical system.

BRIEF DESCRIPTION

Briefly, an apparatus for controlling a rotational speed of a rotary machine comprises a source of pressurized gas; and one or more orifices in fluid communication with the source of pressurized gas for allowing the source of pressurized gas to pass therethrough, wherein the pressurized gas impinges on a surface of a rotating blade of the rotary machine to impart an implied torque thereto, thereby controlling the rotational speed of the rotary machine.

In another aspect of the invention, an apparatus for controlling a rotational speed of an air turbine comprises a source of pressurized air; and one or more jets in fluid communication with the source of pressurized air for allowing the source of pressurized air to pass therethrough, wherein the pressurized air impinges on a surface of a rotating blade of the air turbine to impart an implied torque thereto, thereby controlling the rotational speed of the air turbine.

In yet another aspect of the invention, a method of controlling a rotational speed of a rotary machine comprises the step of providing a source of pressurized gas through one or more orifices in fluid communication with the source of pressurized gas, whereby the pressurized gas impinges on a surface of a rotating blade of the rotary machine to impart an implied torque thereto, thereby controlling the rotational speed of the rotary machine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
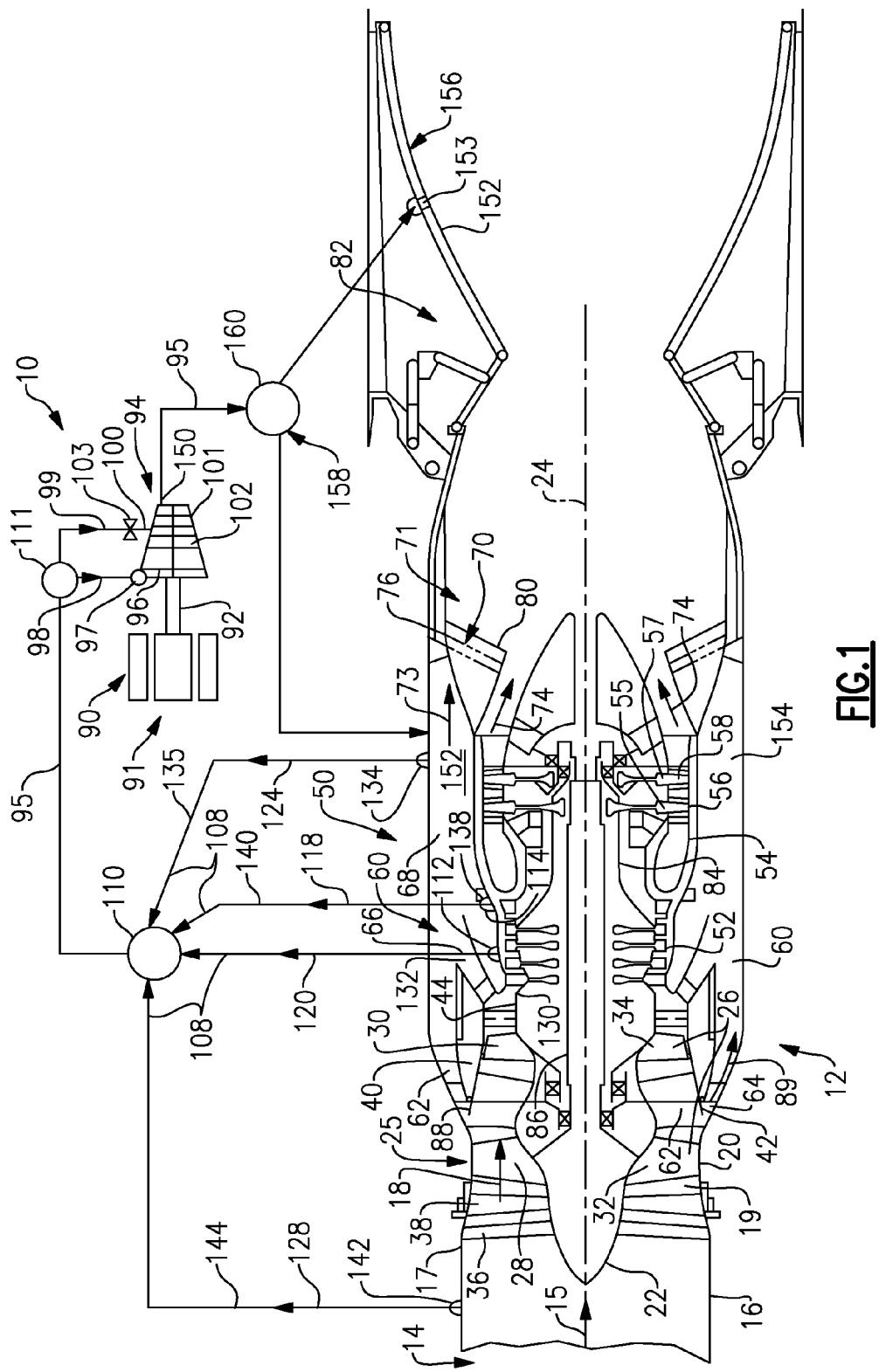
FIG. 1 is a cross-sectional view illustration of a variable cycle turbofan-ramjet engine and a schematically illustrated direct air turbine with orifice(s) for controlling the rotational speed by using pressurized gas according to an embodiment of the invention.
Figure 2:
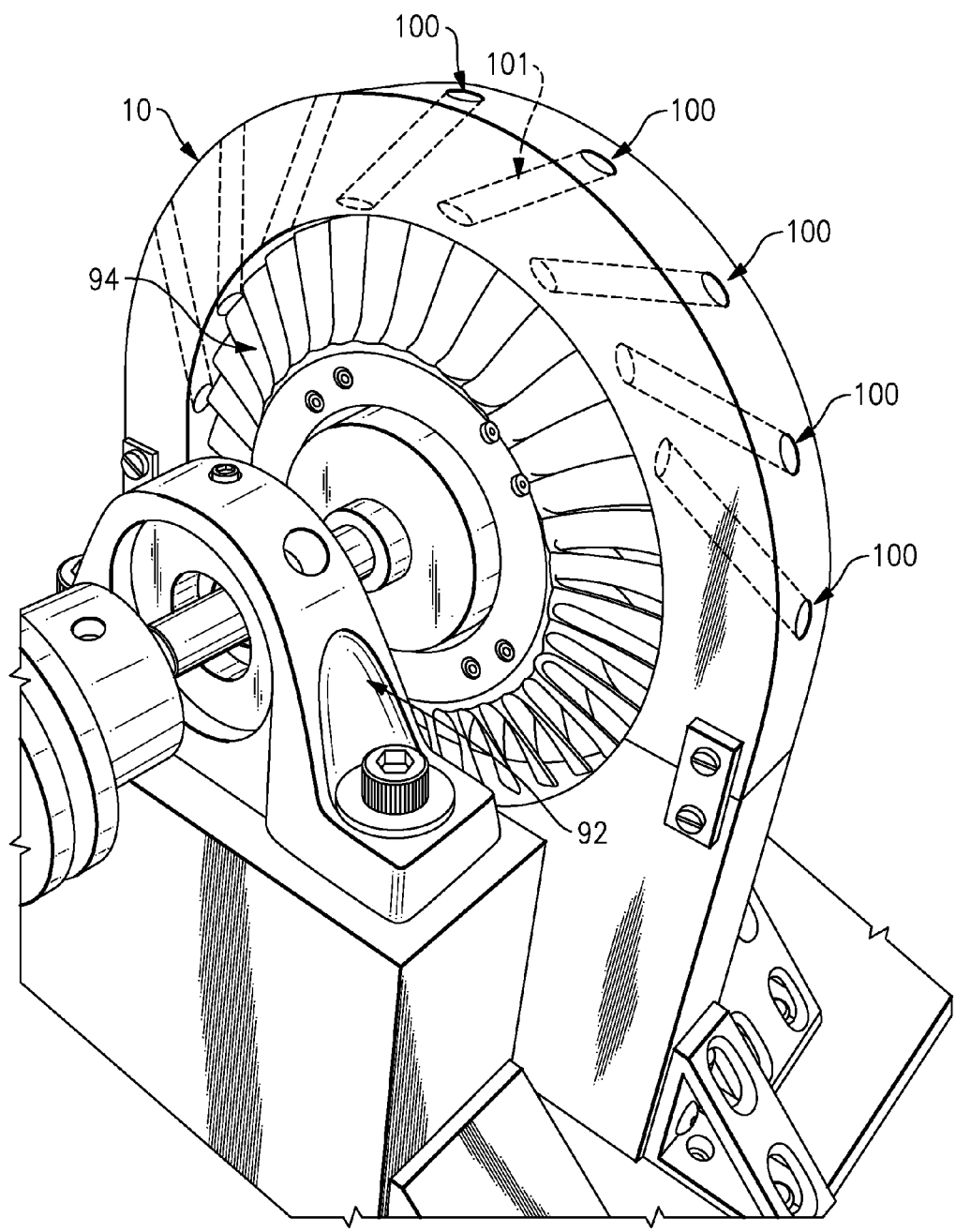
FIG. 2 is a perspective view of an apparatus for controlling a rotational speed of a rotary machine, such as an air turbine, according to an embodiment of the invention.

Referring to the drawings wherein identical reference numerals denote the same elements throughout the various views, FIG. 1 is a schematic illustration of an apparatus, shown generally at 10 for controlling a rotary machine 94, and a variable cycle turbofan-ramjet engine, shown generally at 12 for providing pressurized gas 95, such as pressurized air, to the rotary machine 94. FIG. 2 shows the apparatus 10 for controlling the rotary machine, such as an air turbine 94, according to an embodiment of the invention.

The engine 12 includes a single annular engine inlet duct 16 for receiving ambient air (not illustrated in FIG. 1) from outside the aircraft and conveying inlet duct air 15 from the aircraft inlet 14 and ducting it to an engine inlet 17 of the engine 12. A fan duct 19 extends downstream from the engine inlet 17 and is defined between an outer casing 20 and an inner conical hub 22 both disposed concentrically about a longitudinal centerline axis 24 of the engine 12.

A fan section 25 illustrated as split fan assembly 26 including a forward fan 28 disposed in the fan duct 19 and an aft fan 30 is disposed downstream from the forward fan 28 in flow communication therewith. The forward and aft fans 28 and 30 each include a single row of circumferentially spaced apart forward and aft fan blades 32 and 34, respectively. Inlet guide vanes 36 are disposed in the fan duct 19 upstream of the forward fan 28 and extend between the casing 20 and the hub 22, and variable outlet guide vanes 38 are disposed in the fan duct 19 immediately downstream of the forward fan 28 and extending between the hub 22 and the casing 20. The aft fan 30 includes an outer casing 40 defining a flow splitter 42 at an upstream end thereof, and an inner casing 44 spaced radially inwardly from the outer casing 40.

The engine 12 further includes a core engine 50 disposed downstream from the aft fan 30 and in flow communication therewith. The core engine 50 includes in turn a high pressure compressor (HPC) 52, combustor 54, and a high pressure turbine (HPT) 56. Downstream of the HPT 56 is a low pressure turbine (LPT) 58. The exemplary embodiment of the core engine 50 illustrated herein includes a single row of circumferentially spaced HPT turbine blades 55 in the HPT 56 and a single row of circumferentially spaced LPT turbine blades 57 in the LPT 58. The HPT 56 is drivingly connected to the aft fan 30 and the compressor 52 by first rotor shaft 84. The LPT 58 is drivingly connected to the forward fan 28 by a second rotor shaft 86.

A bypass duct 60 circumscribes the aft fan 30 and the core engine 50 and includes a forward bypass duct 62 surrounding the aft fan 30. The bypass duct 60 operates as a ram duct during a ramjet mode of operation of the engine 12. A forward bypass inlet 64 is in selective flow communication with the forward fan 28. The bypass duct 60 includes an intermediate bypass duct 66 disposed between the aft fan 30 and the core engine 50 in flow communication with the aft fan 30. The bypass duct 60 also includes an aft bypass duct 68 surrounding the core engine 50 and in flow communication with both the forward and intermediate bypass ducts 62 and 66. A mode selector valve 88 is disposed in the forward bypass inlet 64 and is operable in an open position which allows a first portion 89 of the inlet duct air 15 from the forward fan 28 to enter the forward bypass duct 62 and in a closed position which prevents air from the forward fan 28 from entering the forward bypass duct 62.

An augmenter 70, which may be referred to as a ram burner because it operates also in the ramjet mode of operation of the engine 12, is disposed in an exhaust duct 71 downstream of both the core engine 50 and the bypass duct 60 and receives bypass air 72 from the bypass duct 60 and core engine combustion discharge gases 74 from the core engine 50. The augmenter 70 includes a plurality of fuel injectors 76 and flameholders 80 disposed downstream from the fuel injectors 76. The augmenter 70 or ram burner is capable of powering the engine in a ramjet mode. A variable area converging-diverging exhaust nozzle 82 is disposed downstream from the augmenter 70 and in flow communication therewith.

The variable cycle engine 12 is designed to operate in a non-bypass mode wherein the mode selector valve 88 is positioned in the closed position and all of the inlet duct air 15 is directed through the forward fan 28 and the aft fan 30 and then through both the intermediate bypass duct 66 and the core engine 50. The variable cycle engine 12 is also designed to operate in a bypass mode wherein the mode selector valve 88 is positioned in the open position and the inlet duct air 15 is directed from the forward fan 28 to both the forward bypass duct 62 and the aft fan 30, and the air from the aft fan 30 is directed to both the intermediate bypass duct 66 and the core engine 50. The variable cycle engine 12 is also designed to operate in a ramjet mode wherein the mode selector valve 88 is positioned in the open position, the core engine 50 is idled or shut down so that little or no combustion occurs in the combustor 54 for powering the HPT 56 and the LPT 58, and the augmenter 70 is activated as a ram burner for burning the bypass air 72 with fuel from the fuel injectors 76 in the ramjet mode of operation.

The exemplary aircraft accessory system 10 illustrated in FIG. 1 includes a direct air turbine driven constant frequency generator 90 representative of direct air turbine driven accessories. The constant frequency electrical power generator 90 is powered by an air turbine 94 having a variable geometry turbine nozzle 96 and provides constant-frequency or matched-load electrical power without the need for gearing or a frequency controller. The constant frequency electrical power generator 90 is directly connected by an air turbine shaft 92 to the air turbine 94. In non-ramjet and ramjet engines, the elimination of the gearing or a frequency controller can result in a great savings in weight, space, and cost of the aircraft and engine. When engines operate as pure ramjets (above Mach 3.5) or in a ramjet mode, the core engine 50 is idled or shut down so that little or no combustion occurs in the combustor 54 to power the HPT 56 and the LPT 58. In this turbofan jet operating mode, there is not a suitable means available for efficiently operating a gear driven generator. A gearbox or other type of engine main shaft mechanically driven generator for just the turbofan jet mode and a different system for the ramjet mode is unnecessarily costly.

Compressor discharge pressure (CDP) air 118 bled from the compressor discharge stage bleed 114 or interstage HPC bleed air 120 bled from the interstage bleed 112 of the HPC 52 are used in the non-ramjet modes of engine operation. Bypass bleed air 124 bled from the bypass duct 60 is used during the ramjet mode of engine operation. Alternatively, instead of bypass bleed air 124 from the bypass duct 60, ram inlet air 128 bled from the engine inlet duct 16 may use the ramjet mode of engine operation. The interstage bleed 112 includes at least one HPC bleed port 130 which is connected by an HPC bleed duct 132 to the three-way air valve 110. The compressor discharge stage bleed 114 includes at least one CDP bleed port 138 which is connected by a CDP bleed duct 140 to the three-way air valve 110. At least one bypass duct bleed port 134 to the bypass duct 60 is connected by a bypass bleed duct 135 to the three-way air valve 110. Alternatively, the inlet duct 16 has at least one inlet duct bleed port 142 connected by an inlet bleed duct 144 to the three-way air valve 110.

The three-way air valve 110 provides air turbine airflow 95 to a two-way air valve 111 that provides airflow 98 through a port 97 to the variable geometry turbine nozzle 96 of the air turbine 94. Thus, the variable geometry turbine nozzle 96 is in flow communication with the bypass duct 60, an interstage bleed 112 of the HPC 52, and/or compressor discharge stage bleed 114 of the engine 12. In other words, the variable geometry turbine nozzle 96 of the air turbine 94 is in selectable direct flow communication with at least two compressed engine air sources 108, such as a stage of the compressor, or a ram duct, such as the bypass duct 60. The variable geometry turbine nozzle 96 is used to control flow through the air turbine 94 and, hence, air flow rate needed to satisfy turbine torque required for output power at a specific turbine speed.

Under certain operating conditions, the two-way valve 111 also provides high pressure airflow 99 to one or more orifices or jets 100 in the outer casing 101 of the air turbine 94. The orifice(s) 100 are angled such that the airflow 99 will impinge on the face of an approaching rotating blade 102 to apply a torque according to blade geometry, upstream pressure, and mass flow through the orifice(s) 100. In this manner, the airflow 99 through the orifice(s) 100 provides a means for controlling the rotational speed of the blades 102 of the air turbine 94. A variable valve 103 between the two-way valve 111 and the orifice(s) 100 allows the airflow 99 to pass through the orifice(s) 100 only when applying torque to the rotating blades 102 of the air turbine 94.

The air turbine 94 discharges the air turbine airflow 95 through its turbine exit 150 which is in selectable direct flow communication with at least two relatively lower pressure engine air sinks 152 such as exhaust ports 153 located for example in an aft end 154 of the bypass duct 60 and in a divergent section 156 of the exhaust nozzle 82. A two-way air valve 160 selectively connects the turbine exit 150 of the air turbine 94 in exhaust flow communication with either the aft end 154 of the bypass duct 60 or the divergent section 156 of the exhaust nozzle 82. This air turbine exhaust system 158 allows all of the turbine air flow 95 to be returned to the engine exhaust, thus negating the engine net thrust loss which would otherwise occur if the air were dumped overboard.

As mentioned earlier, the variable valve 103 may allow the pressurized airflow 99 to pass through the orifice(s) 100 on the casing 101 of the air turbine 94 under certain operating conditions. For example, one operating condition may be an overspeed condition after loss of load or during starting of the air turbine 94. The rotational speed of the turbine shaft 92 can be determined during operation of the air turbine 94 using means well-known in the art. Once an overspeed condition is detected, for example, the air mass flow through variable valve 103 can be controlled by a control system and strategy that detects the need to apply torque to the rotating blades 102. Alternatively, the control strategy can operate on a choked-jet basis in the case where sufficient upstream air pressure exists. The time between the opening of the valve 103 and the applied torque to the blades 102 should be sufficiently small. Thus, the valve 103 should be placed sufficiently close to the air turbine 104.

Aeromechanical loading of the blades 102 will be affected by, among other things, the velocity of airflow 99, the mass flow, the placement of the orifice(s) 100 with respect to spacing between blades 102, the orientation of the blades 102, and frequency of blade passage (solidity and speed). High frequency loading of the blades 102 may be minimized by staggering the angular position of the orifices(s) or jet nozzle(s) such that their individual torque input are out of phase. This staggering of the angular position also minimizes resonance and flutter. In addition, the blades 102 should be shaped such that the impingement of pressurized gas from the orifice(s) 100 is least axial and most tangential, thereby constraining the turning angle of the loaded stage.

Figure 3:
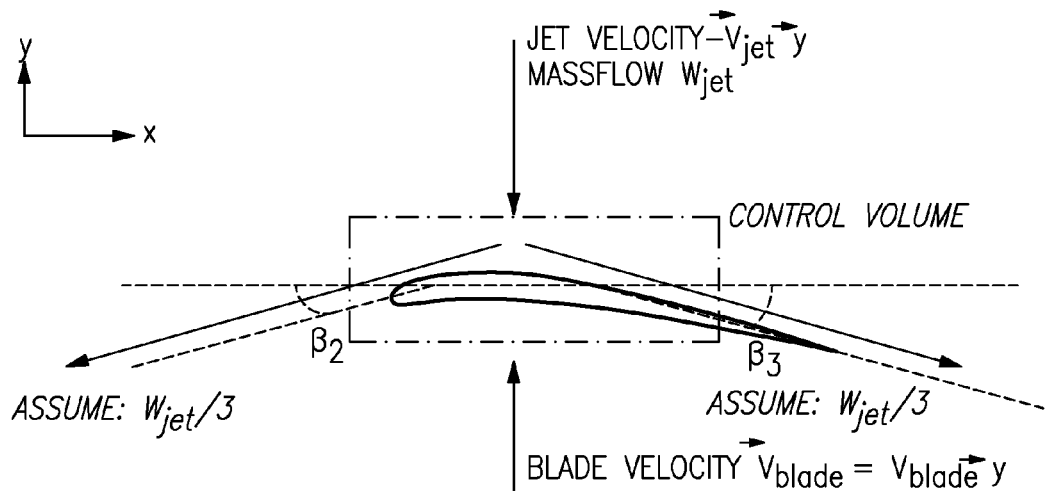
FIG. 3 is a velocity diagram of the blade and gas in the x-y plane of the blade.

FIG. 3 illustrates a velocity diagram of the mass flow of the jet in the x-y plane of the blade. As shown in FIG. 3, the component of the jet velocity in the x-y plane of the blade is the component of the jet velocity in the −y-direction. The component of the blade velocity in the x-y plane of the blade is the component of the blade velocity in the y-direction. Thus, the component of the jet velocity in the x-y plane of the blade is in a direction opposite to the direction of rotation of the blade.

Figure 4:
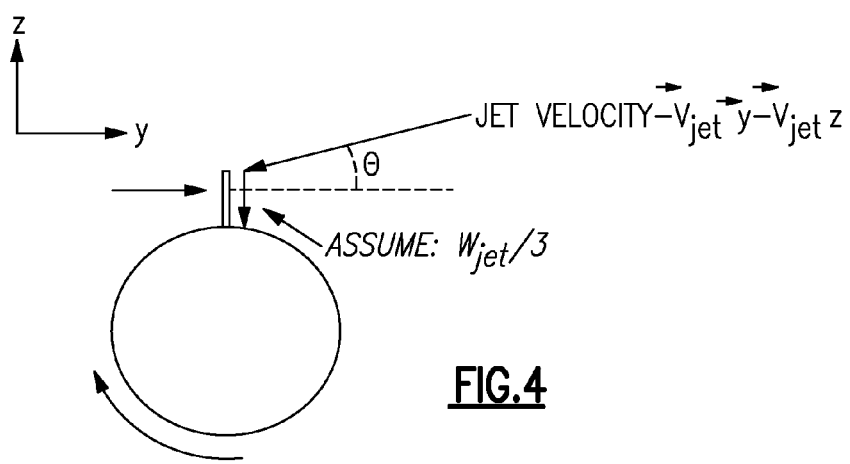
FIG. 4 is a velocity diagram of the blade and gas in the y-z plane of the blade.

FIG. 4 illustrates a velocity diagram of the mass flow of the jet in the y-z plane of the blade. The turbine shaft is shown to be along the x-axis and the blade rotates in the direction of the y-axis. As shown in FIG. 3, the component of the jet velocity in the y-z-plane is the component in the −y-direction and in the −z-direction.

In FIGS. 3 and 4, it is assumed that two-thirds of the mass flow of the jet is in the x-y plane of FIG. 3, while one-third of the mass flow is in the y-z plane of FIG. 4.

From the conservation of momentum:

$$F_{blade} = \frac{W_{jet}}{3}(V_{jet} + V_{blade})[1 + \cos\beta_2 + \cos\beta_3]\cos^2\theta \quad \text{(Eq. 1)}$$

where,
$F_{blade}$=the force exerted by the pressurized gas on the blade,
$W_{jet}$=the mass flow of the jet of pressurized gas,
$V_{jet}$=the velocity of the jet of pressurized gas,
$V_{blade}$=the velocity of the blade,
$\beta_2$=the angle of one side of the blade with respect to the x-axis, and
$\beta_3$=the angle of the other side of the blade with respect to the x-axis.

The applied torque on the blade by the pressurized gas can be obtained by multiplying the force exerted by the pressurized gas on the blade by the radius of the blade.

Tests were conducted to determine the effectiveness of the applied torque on various configurations. Specifically, a total of fifteen tests were conducted at five different rotational speeds (4 k, 6 k, 8 k, 10 k and 12 k rpm) of the blades 102 and three different number of orifices or jets 100 (4, 6 and 8 jets) arranged with the largest possible spacing.

The results of the tests suggest that the best use of air (most torque per mass flow) occurs when the orifice(s) or jet(s) 100 are spaced widely apart. In particular, the best use of air occurs when the orifice or jet 100 is isolated from another orifice or jet. Tests also indicated that noise may be a concern and proper acoustic isolation may be required.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for controlling a rotational speed of a rotary machine, comprising:
   a source of pressurized gas; and
   one or more orifices in fluid communication with the source of pressurized gas for allowing the source of pressurized gas to pass therethrough, the one or more orifices located in an outer casing of an air turbine, and an angular position of the one or more orifices are staggered such that their individual implied torque is out of phase,
   wherein the pressurized gas impinges on a surface of a rotating blade of the rotary machine to impart an implied torque thereto, thereby controlling the rotational speed of the rotary machine.

2. An apparatus according to claim 1, wherein the source of pressurized gas comprises air.

3. An apparatus according to claim 1, wherein the rotary machine comprises an air turbine.

4. An apparatus according to claim 3, wherein the source of pressurized gas comprises pressurized air that is supplied from a variable valve of the air turbine.

5. An apparatus for controlling a rotational speed of an air turbine, comprising:
   a source of pressurized air; and
   one or more jets in fluid communication with the source of pressurized air for allowing the source of pressurized air to pass therethrough, the one or more jets located in an outer casing of the air turbine, and an angular position of the one or more jets are staggered such that their individual implied torque is out of phase,
   wherein the pressurized air impinges on a surface of a rotating blade of the air turbine to impart an implied torque thereto, thereby controlling the rotational speed of the air turbine.

6. An apparatus according to claim 5, wherein the source of pressurized air is supplied from a variable valve of the air turbine.

7. A method of controlling a rotational speed of a rotary machine comprising the step of providing a source of pressurized gas through one or more orifices in fluid communication with the source of pressurized gas, the one or more orifices located in an outer casing of an air turbine, and an angular position of the one or more orifices are staggered such that their individual implied torque is out of phase, whereby the pressurized gas impinges on a surface of a rotating blade of the rotary machine to impart an implied torque thereto, thereby controlling the rotational speed of the rotary machine.

8. A method according to claim 7, wherein the source of pressurized gas comprises air.

9. A method according to claim 7, wherein the rotary machine comprises an air turbine.

10. A method according to claim 9, wherein the source of pressurized gas comprises pressurized air that is supplied from a variable valve of the air turbine.

* * * * *